(12) United States Patent
Jia et al.

(10) Patent No.: US 12,069,374 B2
(45) Date of Patent: Aug. 20, 2024

(54) METHOD AND APPARATUS FOR DETERMINING CONNECTION RELATION OF SUBSPACES, AND NON-TRANSITORY COMPUTER-READABLE RECORDING MEDIUM

(71) Applicants: Haijing Jia, Beijing (CN); Hong Yi, Beijing (CN); Liyan Liu, Beijing (CN); Wei Wang, Beijing (CN)

(72) Inventors: Haijing Jia, Beijing (CN); Hong Yi, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 17/807,932

(22) Filed: Jun. 21, 2022

(65) Prior Publication Data
US 2023/0007172 A1    Jan. 5, 2023

(30) Foreign Application Priority Data

Jun. 30, 2021  (CN) .............................. 202110734097

(51) Int. Cl.
| | | |
|---|---|---|
| *H04N 23/698* | (2023.01) | |
| *G06T 5/50* | (2006.01) | |
| *G06T 7/73* | (2017.01) | |
| *H04N 23/80* | (2023.01) | |

(52) U.S. Cl.
CPC ............. *H04N 23/698* (2023.01); *G06T 5/50* (2013.01); *G06T 7/73* (2017.01); *H04N 23/80* (2023.01)

(58) Field of Classification Search
CPC ........ H04N 23/698; H04N 23/80; G06T 5/50; G06T 7/73; G06T 3/4038; G06T 2207/30244; G06T 19/006; G06T 2200/04

See application file for complete search history.

(56) References Cited

U.S. PATENT DOCUMENTS

| | | | |
|---|---|---|---|
| 2022/0027656 A1 | 1/2022 | Jia et al. | |
| 2022/0164984 A1 | 5/2022 | Jia et al. | |
| 2022/0224833 A1* | 7/2022 | Cier ....................... | H04N 5/445 |

\* cited by examiner

*Primary Examiner* — Farzana Hossain
(74) *Attorney, Agent, or Firm* — IPUSA, PLLC

(57) ABSTRACT

A method and an apparatus for determining a connection relation of subspaces, and a non-transitory computer-readable recording medium are provided. In the method, a plurality of sets of panoramic images respectively corresponding to two respective adjacent subspaces are obtained. Each set of the panoramic images includes two first panoramic images, and a second panoramic image photographed at a connection opening. Orientations of the connection openings are determined based on positions of the connection openings, and orientations of a camera. Relative positions of the two adjacent subspaces are determined based on correspondence relations between the two first panoramic images and parts of the respective second panoramic images. The connection relation of the subspaces is determined based on the connection relation determined based on the same subspace, the orientations of the connection openings, and the relative positions of the two adjacent subspaces.

11 Claims, 7 Drawing Sheets

FIG.1

S101: OBTAIN SETS OF PANORAMIC IMAGES RESPECTIVELY CORRESPONDING TO SETS OF SUBSPACES IN THREE-DIMENSIONAL SPACE, EACH SET OF SUBSPACES BEING COMPOSED OF TWO ADJACENT SUBSPACES IN THREE-DIMENSIONAL SPACE, AND EACH SET OF PANORAMIC IMAGES INCLUDING TWO FIRST PANORAMIC IMAGES THAT RESPECTIVELY PHOTOGRAPHED IN TWO ADJACENT SUBSPACES OF RESPECTIVE SET OF SUBSPACES, AND SECOND PANORAMIC IMAGE PHOTOGRAPHED AT CONNECTION OPENING THAT CONNECTS TWO ADJACENT SUBSPACES

S102: DETERMINE ORIENTATIONS OF RESPECTIVE CONNECTION OPENINGS BASED ON POSITIONS OF CONNECTION OPENINGS IN RESPECTIVE SECOND PANORAMIC IMAGES, AND ORIENTATIONS OF CAMERA WHEN PHOTOGRAPHING RESPECTIVE SECOND PANORAMIC IMAGES

S103: OBTAIN CORRESPONDENCE RELATIONS BETWEEN TWO FIRST PANORAMIC IMAGES IN RESPECTIVE SETS OF PANORAMIC IMAGES AND PARTS OF SECOND PANORAMIC IMAGES IN RESPECTIVE SETS OF PANORAMIC IMAGES, AND DETERMINE RELATIVE POSITIONS OF TWO ADJACENT SUBSPACES IN RESPECTIVE SETS OF SUBSPACES BASED ON CORRESPONDENCE RELATIONS

S104: RECOGNIZE FIRST PANORAMIC IMAGES IN SETS OF PANORAMIC IMAGES THAT CORRESPOND TO SAME SUBSPACE, DETERMINE CONNECTION RELATION BETWEEN RESPECTIVE SETS OF SUBSPACES BASED ON SAME SUBSPACE, AND DETERMINE CONNECTION RELATION OF SUBSPACES IN THREE-DIMENSIONAL SPACE BASED ON DETERMINED CONNECTION RELATION BETWEEN SETS OF SUBSPACES, ORIENTATIONS OF RESPECTIVE CONNECTION OPENINGS, AND RELATIVE POSITIONS OF TWO ADJACENT SUBSPACES IN RESPECTIVE SETS OF SUBSPACES

METHOD AND APPARATUS FOR DETERMINING CONNECTION RELATION OF SUBSPACES, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202110734097.9 filed on Jun. 30, 2021, the entire contents of which are incorporated herein by reference.

BACKGROUND OF THE INVENTION

1. Field of the Invention

The present disclosure relates to the field of image processing, and specifically, a method and an apparatus for determining a connection relation of subspaces by processing panoramic images, and a non-transitory computer-readable recording medium.

2. Description of the Related Art

Currently, in the fields of virtual reality (VR), real estate and the likes, it is usually necessary to obtain a two-dimensional layout image (for example, a floor plan) that reflects a two-dimensional layout of an entire three-dimensional space. The two-dimensional layout image enables users to intuitively understand subspace division of the entire three-dimensional space, and can also be used as a navigation image during a virtual tour. Initially, the two-dimensional layout image was usually obtained by professionals by measuring and drawing. In recent years, with the development of technologies such as computer vision and artificial intelligence, the two-dimensional layout image can be automatically generated using a plurality of panoramic images obtained by photographing a three-dimensional scene. In the process of generating the two-dimensional layout image, an important step is to obtain a connection relation of subspaces in a three-dimensional space (for example, rooms in a house).

In a conventional method, when determining the connection relation of the subspaces, a relative pose (i.e., a rotation matrix and a translation matrix) of a camera may be determined using sensor information when the camera photographs panoramic images in two subspaces. However, in such a method, it is necessary to ensure that a distance between two photographing places is not too far, so as to ensure that three-dimensional scenes corresponding to the two panoramic images obtained by photographing have a sufficient degree of coincidence.

SUMMARY OF THE INVENTION

According to an aspect of the present disclosure, a method for determining a connection relation of subspaces is provided. The method includes obtaining a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces; determining, based on positions of the connection openings in the respective second panoramic images, and orientations of a camera when photographing the respective second panoramic images, orientations of the respective connection openings; obtaining correspondence relations between the two first panoramic images in the respective sets of the panoramic images and parts of the second panoramic images in the respective sets of panoramic images; determining, based on the correspondence relations, relative positions of the two adjacent subspaces in the respective sets of the subspaces; recognizing the first panoramic images in the sets of the panoramic images that correspond to the same subspace; determining, based on the same subspace, the connection relation between the respective sets of the subspaces; and determining, based on the determined connection relation between the sets of the subspaces, the orientations of the respective connection openings, and the relative positions of the two adjacent subspaces in the respective sets of the subspaces, the connection relation of the subspaces in the three-dimensional space.

According to another aspect of the present disclosure, an apparatus for determining a connection relation of subspaces is provided. The apparatus includes a memory storing computer-executable instructions; and one or more processors. The one or more processors are configured to execute the computer-executable instructions such that the one or more processors are configured to obtain a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces; determine, based on positions of the connection openings in the respective second panoramic images, and orientations of a camera when photographing the respective second panoramic images, orientations of the respective connection openings; obtain correspondence relations between the two first panoramic images in the respective sets of the panoramic images and parts of the second panoramic images in the respective sets of panoramic images; determine, based on the correspondence relations, relative positions of the two adjacent subspaces in the respective sets of the subspaces; recognize the first panoramic images in the sets of the panoramic images that correspond to the same subspace; determine, based on the same subspace, the connection relation between the respective sets of the subspaces; and determine, based on the determined connection relation between the sets of the subspaces, the orientations of the respective connection openings, and the relative positions of the two adjacent subspaces in the respective sets of the subspaces, the connection relation of the subspaces in the three-dimensional space.

According to another aspect of the present disclosure, a non-transitory computer-readable recording medium having computer-executable instructions for execution by one or more processors is provided. The computer-executable instructions, when executed, cause the one or more processors to carry out a method for determining a connection relation of subspaces. The method includes obtaining a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces; determining, based on positions of the connection openings in the respective second panoramic images, and orientations of a camera when photographing the respective second panoramic images, orientations of the respective connection openings; obtaining correspondence relations between the two first panoramic images in the respective sets of the panoramic images and parts of the second panoramic images in the respective sets of panoramic images; determining, based on the correspondence relations, relative positions of the two adjacent subspaces in the respective sets of the subspaces; recognizing the first panoramic images in the sets of the panoramic images that correspond to the same subspace; determining, based on the same subspace, the connection relation between the respective sets of the subspaces; and determining, based on the determined connection relation between the sets of the subspaces, the orientations of the respective connection openings, and the relative positions of the two adjacent subspaces in the respective sets of the subspaces, the connection relation of the subspaces in the three-dimensional space.

BRIEF DESCRIPTION OF THE DRAWINGS

The above and other objects, features and advantages of the present disclosure will be further clarified the following detailed description of embodiments of the present disclosure in combination with the drawings.

FIG. 1 is a flowchart illustrating a method 100 for determining a connection relation of subspaces according to an embodiment of the present disclosure.

DESCRIPTION OF THE EMBODIMENTS

Figure 2:
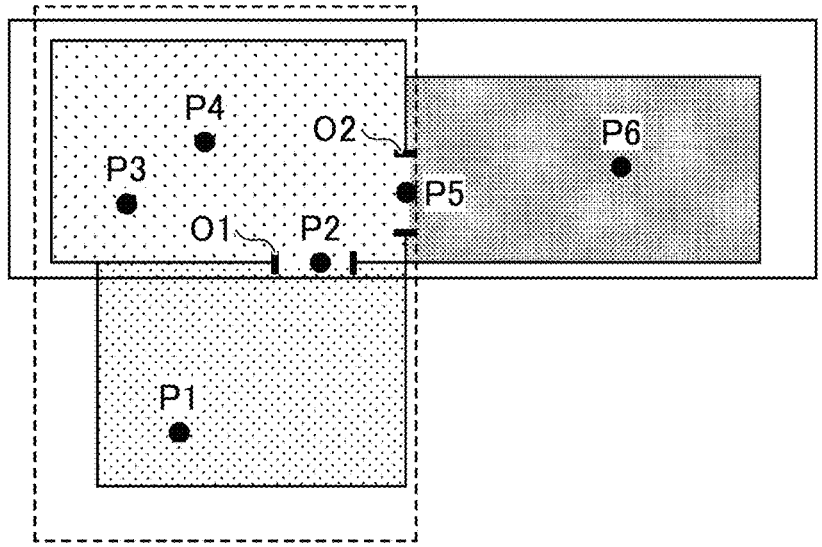
FIG. 2 is a schematic diagram illustrating a two-dimensional layout image of a three-dimensional space according to the embodiment of the present disclosure.

In the following, the method for managing the consortium chain data structure network, the management node, and the non-transitory computer-readable recording medium according to the embodiments of the present disclosure will be described with reference to the accompanying drawings. In the drawings, the same reference numbers refer to the same elements. Note that the embodiments described herein are illustrative only and are not intended to limit the scope of the present disclosure.

In view of the problem of the conventional technology, an object of the embodiments of the present disclosure is to provide a method and an apparatus for determining a connection relation of subspaces, and a non-transitory computer-readable recording medium. A two-dimensional layout image of a three-dimensional space can be automatically generated based on the determined connection relation of the subspaces.

A method for determining a connection relation of subspaces according to an embodiment of the present disclosure will be described below with reference to FIG. 1. FIG. 1 is a flowchart illustrating a method 100 for determining a connection relation of subspaces according to an embodiment of the present disclosure.

As shown in FIG. 1, in step S101, a plurality of sets of panoramic images respectively corresponding to a plurality of sets of the subspaces in a three-dimensional space are obtained. Each set of the subspaces are composed of two adjacent subspaces in the three-dimensional space. Each set of the panoramic images include two first panoramic images that respectively photographed in the two adjacent subspaces of the respective sets of the subspaces, and a second panoramic image photographed at a connection opening that connects the two adjacent subspaces.

In this step, the sets of the panoramic images respectively corresponding to the sets of the subspaces in the three-dimensional space may be obtained in various ways. For example, the panoramic images (for example, equidistant cylindrical projection images) may be obtained using a panoramic camera (for example, a fisheye camera, a binocular camera, or the like). As another example, a plurality of perspective images may be obtained using a common camera, and the perspective images may be stitched together to obtain panoramic images respectively.

FIG. 2 is a schematic diagram illustrating a two-dimensional layout image of a three-dimensional space according to the embodiment of the present disclosure. The three-dimensional space may be composed of a plurality of subspaces, the subspaces may be obtained by dividing the three-dimensional space in various ways, and two adjacent subspaces may be connected by a connection opening therebetween. For example, in a case where the three-dimensional space is a building interior space, the building interior space may be divided into a plurality of mutually independent rooms serving as the subspaces by objects such as walls, partitions or windows, and two adjacent rooms may be connected by a door serving as the connection opening. According to the embodiment of the present disclosure, the connection relation of the subspaces in the three-dimensional space may be determined based on the panoramic images photographed in the subspaces in the three-dimensional space and the panoramic image photographed under the connection opening, thereby automatically generating a two-dimensional layout image similar to the image shown in FIG. 2. Furthermore, since the panoramic image that is photographed under the connection opening serves as a connection image of the images corresponding to the two adjacent subspaces, it is not required that a distance between two photographing places in the two adjacent subspaces is not too far.

In the example of FIG. 2, the three-dimensional space may include three subspaces, and each set of the subspaces may be composed of two adjacent subspaces. Namely, two adjacent subspaces within the dashed box in FIG. 2 may be a set of subspaces space, and the two adjacent subspaces within the solid-line box in FIG. 2 may be another set of subspaces. In this step, the sets of panoramic images corresponding to the sets of the subspaces may be obtained. Here, each set of the panoramic images may include two first panoramic images that respectively photographed in the two adjacent subspaces of the respective sets of the subspaces, and a second panoramic image photographed at a connection opening that connects the two adjacent subspaces. For example, as shown in FIG. 2, a set of panoramic images may include two first panoramic images photographed at positions P1 and P3 in two adjacent subspaces, respectively, and a second panoramic image photographed at a connection opening O1 that connects the two adjacent subspaces (i.e., at position P2). Meanwhile, another set of panoramic images may include two first panoramic images photographed at positions P4 and P6 in another two adjacent subspaces, respectively, and a second panoramic image photographed at a connection opening O2 that connects the two adjacent subspaces (i.e., at position P5). Here, two panoramic images are photographed at position P3 and position P4 in the same subspace, respectively. Note that although the three-dimensional space includes only three subspaces as shown in FIG. 2, the present disclosure is not limited to this example, and the method for determining the connection relation of the subspaces according to the embodiment of the present disclosure may also be applied to a case where the three-dimensional space includes four or more subspaces. In addition, in a case where one or more panoramic images are photographed in the same subspace, the one or more panoramic images may be obtained by photographing at the same position in the subspace multiple times, and the present disclosure is not limited this example.

In this step, the first panoramic images and the second panoramic images of the sets of the subspaces may be generated in a predetermined photographing order, and the sets of panoramic images may be obtained by grouping the first panoramic images and the second panoramic images of the sets of the subspaces in the predetermined photographing order. For example, as shown in FIG. 2, if the first panoramic images and the second panoramic images of the sets of the subspaces are generated in a predetermined photographing order of P1, P2, P3, P4, P5 and P6, the first three panoramic images may classified into a group and the last three panoramic images may classified into another group in the predetermined photographing order. As another example, if the first panoramic images and the second panoramic images of the sets of the subspaces are generated in a predetermined photographing order of P2, P5, P1, P3, P4 and P6, the first, third and fourth panoramic images may classified into a group and the second, fifth and sixth panoramic images may classified into another group in the predetermined photographing order. Thus, in the embodiment of the present disclosure, the input panoramic images can be automatically grouped in the predetermined photographing order previously input or set by a user, thereby facilitating subsequent processing.

Note that since the camera may not be completely horizontally disposed during the actual photographing process, the panoramic image obtained by photographing may be skewed to a certain extent. In this case, vertical correction processing may be performed on the first panoramic images and the second panoramic image, before the subsequent processing is performed on the obtained first panoramic images and the second panoramic image, so as to improve the accuracy of the subsequent processing.

In step S102, orientations of the respective connection openings are determined based on positions of the connection openings in the respective second panoramic images, and orientations of a camera when photographing the respective second panoramic images.

Figure 3:
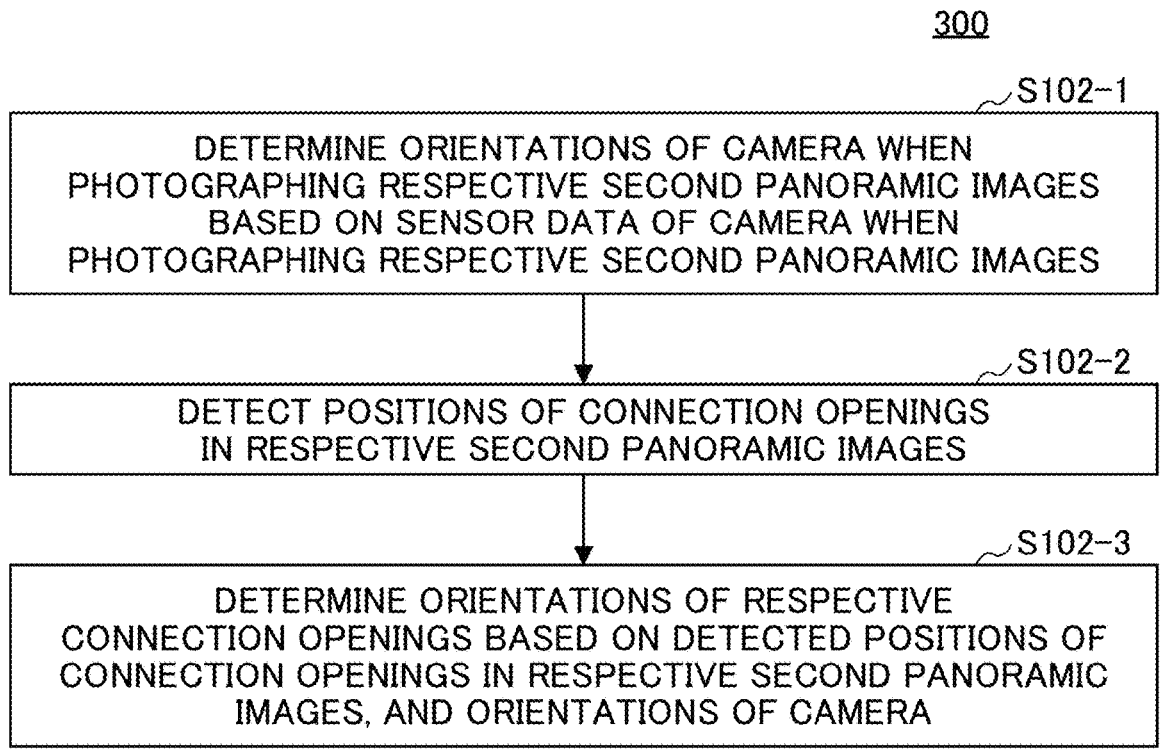
FIG. 3 is a flowchart illustrating a method 300 for determining orientations of connection openings.

FIG. 3 is a flowchart illustrating a method 300 for determining orientations of connection openings. Here, the steps shown in FIG. 3 are sub-steps of step S102.

In sub-step S102-1, orientations of the camera when photographing the respective second panoramic images are determined based on sensor data of the camera when photographing the respective second panoramic images.

Figure 4:
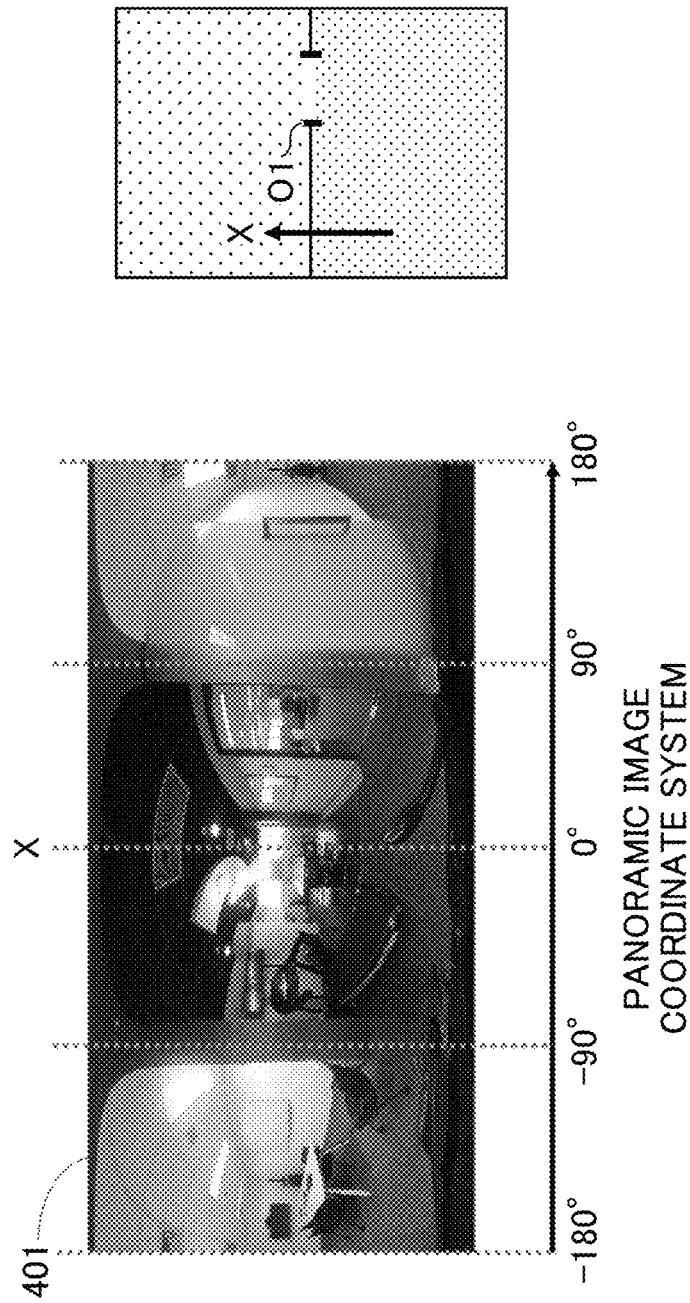
FIG. 4 is a schematic diagram illustrating an example of a reference orientation according to the embodiment of the present disclosure.

Specifically, the camera orientation when photographing any one second panoramic image may be used as a reference orientation, so that the camera orientations when photographing other second panoramic images are determined based on the reference orientation. FIG. 4 is a schematic diagram illustrating an example of a reference orientation according to the embodiment of the present disclosure. The left portion of FIG. 4 shows the second panoramic image 401 photographed at the connection opening O1, the arrow direction X shown in the right portion of FIG. 4 is a camera orientation when photographing the second panoramic image 401 in a top view, and the camera orientation corresponds to a position of a central image column of the second panoramic image 401. Here, the position of the central image column is a position of an image in the most central column of the panoramic image in a horizontal direction (for example, a 0 degree position in the panoramic image coordinate system shown in FIG. 4). In this example, the camera orientation X when photographing the second panoramic image 401 at the connection opening O1 may be used as the reference orientation. Additionally, in another example, a camera orientation when photographing the second panoramic image at the connection opening O2 may also be used as the reference orientation, and the present disclosure is not limited these examples.

In a case where the camera orientation X when photographing the second panoramic image 401 at the connection opening O1 is used as the reference orientation, an included angle between a camera orientation when photographing another second panoramic image and the reference orientation may be determined based on sensor data of the camera, so that the camera orientation when photographing another second panoramic image is obtained. Specifically, an included angle between the camera orientation when photographing the second panoramic image at the connection opening O2 and the reference orientation X may be determined based on sensor data of the camera when photographing the second panoramic image at the connection openings O1 and O2, so that the camera orientation Y (not shown in FIG. 4) when photographing the second panoramic image at the connection opening O2 is obtained. For example, in a case where the determined included angle is α, the camera orientation Y=X+α when photographing the second panoramic image at the connection opening O2 can be obtained. Thus, the orientations of the connection opening O1 and the connection opening O2 can be finally determined based on the camera orientations X and Y in subsequent steps.

In sub-step S102-2, the positions of the connection openings are detected in the respective second panoramic images.

In an example, the second panoramic images may be input to a trained object detection model so as to obtain two bounding boxes corresponding to the connection openings output by the object detection model, and most central positions of the two bounding boxes in the horizontal direction may be used as the detected positions of the connection openings. Here, the object detector model may be a model trained by a target detection algorithm based on a deep neural network, such as a YOLOv3 object detection model. However, other types of object detection models may also be used, and the present disclosure is not limited these examples.

Figure 5:
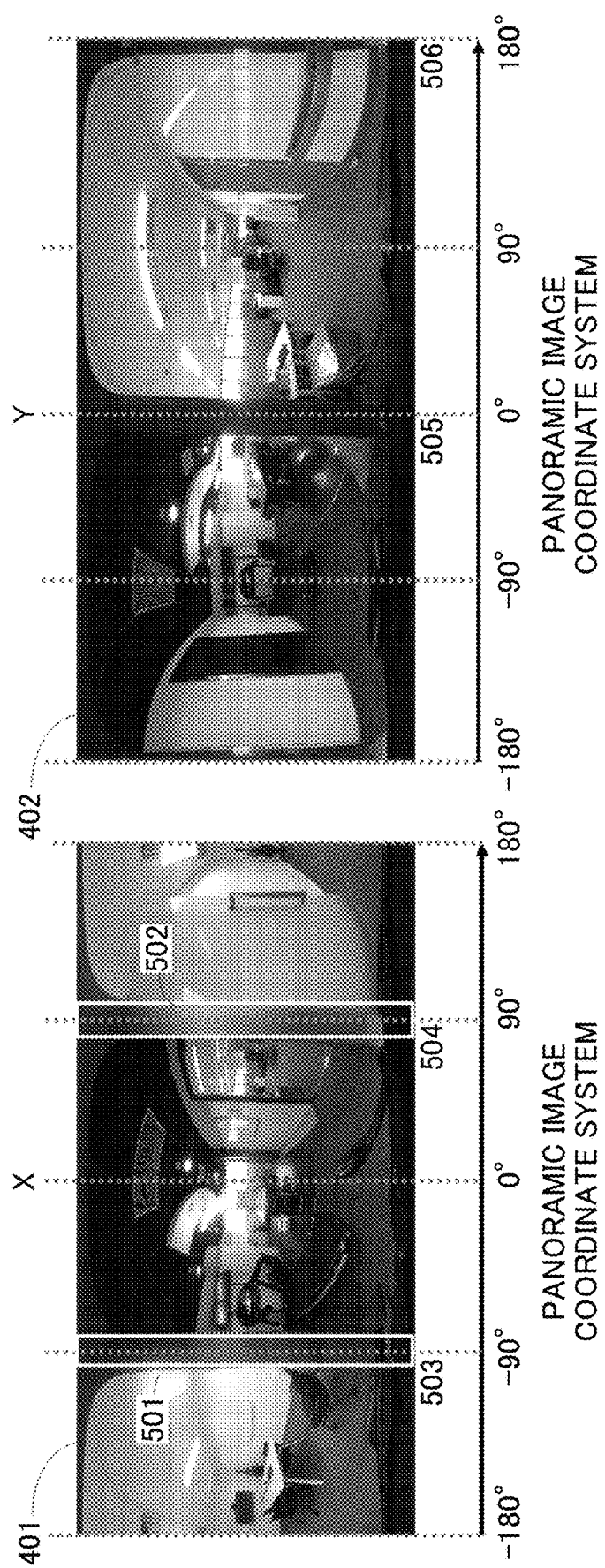
FIG. 5 is a schematic diagram illustrating a step of detecting a position of a connection opening according to the embodiment of the present disclosure.

FIG. 5 is a schematic diagram illustrating a step of detecting a position of a connection opening according to the embodiment of the present disclosure.

The left portion of FIG. 5 shows the same second panoramic image 401 as the image shown in FIG. 4, which is photographed at the connection opening O1, and the right portion of FIG. 5 further shows the second panoramic image 402 photographed at the connection opening O2. As shown in FIG. 5, two bounding boxes 501 and 502 corresponding to the connection opening O1 output by the object detection model may be obtained by inputting the second panoramic image 401 photographed at the connection opening O1 to the object detection model. The most central positions 503 and 504 of the bounding boxes 501 and 502 in the horizontal direction may be used as the detected positions of the connection opening O1, respectively. It can be seen from FIG. 5 that the most central positions 503 and 504 are located approximately at a 90 degrees position and a −90 degrees position in the panoramic image coordinate system.

In another example, the position of the connection opening may be detected by using the object detection model and calculating a variance of pixels of each column in the respective second panoramic images. Specifically, since the connection openings generally have less variation in texture, color and the like, the difference of pixels of the column corresponding to the connection opening should be minimal compared to the pixels of other columns. Accordingly, the variance of pixels of each column in the second panoramic image may be calculated respectively, and a horizontal coordinate of the column whose variance of pixels is the smallest may be used as one of the detected positions of the connection openings. Furthermore, another horizontal coordinate that is spaced from the horizontal coordinate by a half of a horizontal width of the panoramic image may be used as another position of the connection opening.

Similarly, the above steps may be repeated for the second panoramic image 402 photographed at the connection opening O2, so as to obtain positions 505 and 506 of the detected connection opening O2. It can be seen from FIG. 5 that the positions 505 and 506 are located approximately at a 0 degree position and a 180 degrees position in the panoramic image coordinate system.

In sub-step S102-3, the orientations of the respective connection openings are determined based on the detected positions of the connection openings in the respective second panoramic images, and the orientations of the camera.

In this sub-step, the orientations of the respective connection openings may be determined based on differences between the positions of the connection openings in the respective second panoramic images and positions of respective central image columns, and the orientations of the camera. Here, the orientation of the connection opening may be represented by a direction of a straight line passing through a specific connection opening.

As shown in FIG. 5, in the second panoramic image 401, the differences between the positions 503 and 504 of the detected connection opening O1 and the position of the central image column (as described above, the position of the central image column is a 0 degree position in the panoramic image coordinate system that corresponds to the camera orientation X when photographing the second panoramic image 401) are approximately 90 degrees and −90 degrees. It may be determined that the included angle between the orientation of the connection opening O1 and the camera orientation X is 90 degrees, based on this difference, that is, the orientation of those two are substantially perpendicular to each other.

Similarly, in the second panoramic image 402, the differences between the positions 505 and 506 of the detected connection opening O2 and the position of the central image column (as described above, the position of the central image column is a degree position in the panoramic image coordinate system that corresponds to the camera orientation Y when photographing the second panoramic image 402) are approximately 0 degree and 180 degrees. It may be determined that the included angle between the orientation of the connection opening O2 and the camera orientation Y is 0 degree, based on this difference, that is, the orientation of those two are substantially parallel to each other.

After obtaining the included angles between the orientations of the respective connection openings and the respective camera orientations, the orientations of the respective connection openings may be converted into an absolute orientation corresponding to the same reference orientation using the camera orientations, so as to finally determine the orientation of the connection opening. Specifically, in this example, since it is determined that the reference orientation is the camera orientation X, and the included angle between the orientation of the connection opening O1 and the camera orientation X is 90 degrees, it is finally determined that the orientation of the connection opening is X+90 degrees. Furthermore, in a case where the included angle between the camera orientation Y and the reference orientation is α (namely, the camera orientation is Y=X+α), and the included angle between the orientation of the connection opening O2 and the camera orientation Y is degree, it is finally determined that the orientation of the connection opening O2 is X+α. Through the above process, the orientation of the connection opening can be determined, and then relative positions of the two adjacent subspaces may be determined in step S103.

In step S103, correspondence relations between the two first panoramic images in the respective sets of the panoramic images and parts of the second panoramic images in the respective sets of panoramic images are obtained, and the relative positions of the two adjacent subspaces in the respective sets of the subspaces are determined based on the correspondence relations.

In this step, the second panoramic images may be divided into two respective sub-images, based on the detected positions of the connection openings in the respective second panoramic images in the respective sets of panoramic images. Then, similarities between the two first panoramic images and the two respective sub-images in the respective sets of panoramic images may be compared to obtain the correspondence relations.

Figure 6:
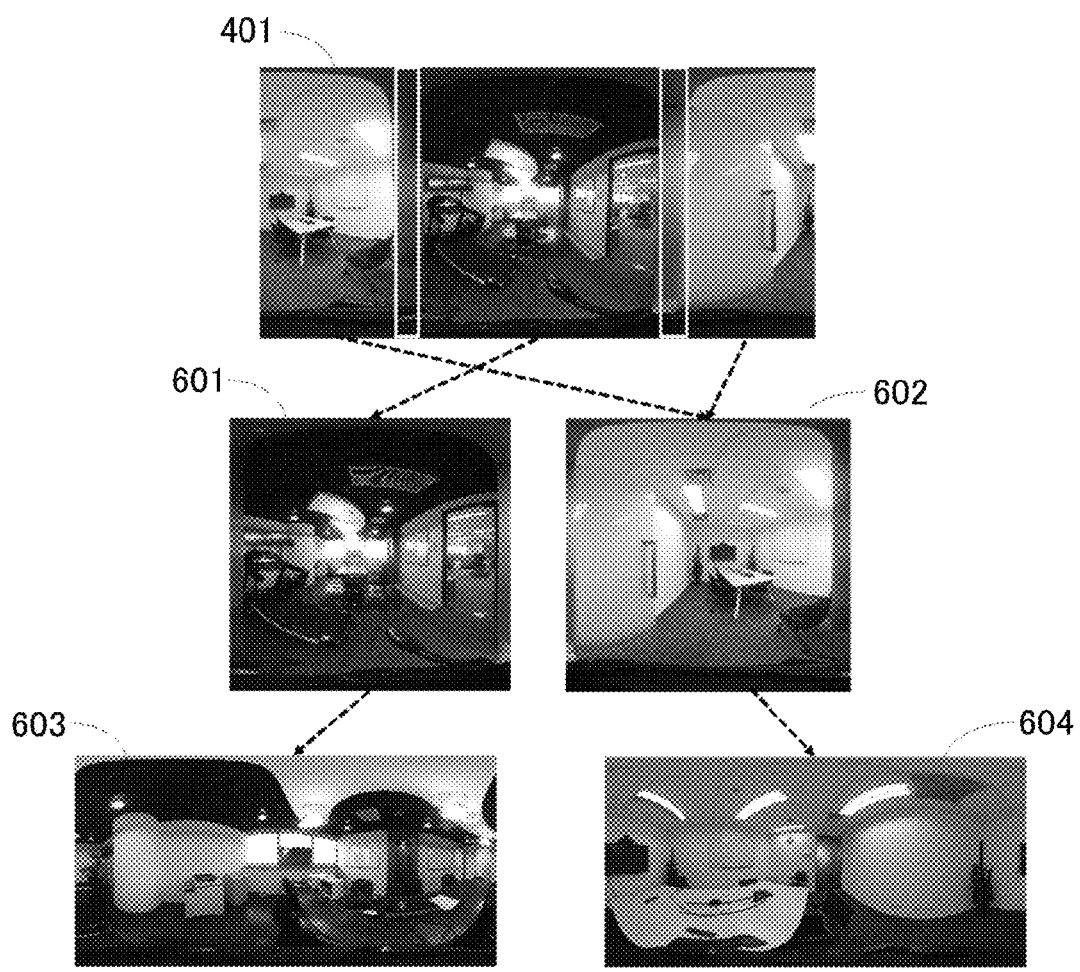
FIG. 6 is a schematic diagram illustrating a step of obtaining a correspondence relation between two first panoramic images and a part of a second panoramic image.

FIG. 6 is a schematic diagram illustrating a step of obtaining a correspondence relation between two first panoramic images and a part of a second panoramic image. As shown in FIG. 6, the second panoramic image 401 may be divided into two sub-images 601 and 602 by dividing the second panoramic image 401 at the position of the connection opening O1 detected from the second panoramic image 401 in a set of panoramic images. Here, the sub-image 601 is an image obtained by segmenting a middle portion of the second panoramic image 401, and the sub-image 602 is an image obtained by segmenting and splicing the portions on the left and right edges of the second panoramic image 402. The two sub-images correspond to the two adjacent subspaces connected by the connection opening O1, respectively.

Additionally, FIG. 6 further shows a first panoramic image 603 and a first panoramic image 604 in the set of panoramic images, which are respectively photographed in the two adjacent subspaces. By comparing the similarities between the first panoramic images 603 and 604 and the two sub-images 601 and 602, respectively, it may be determined that the first panoramic image 603 is more similar to the sub-image 601 and the first panoramic image 604 is more similar to the sub-image 602. Thus, it may be determined that the first panoramic image 603 corresponds to the sub-image 601 and the first panoramic image 604 corresponds to the sub-image 602. In this step, a first panorama image and a sub-image may be input to a trained comparison model to obtain the similarity of the two images output by the model, so that a correspondence relation between the first panorama image and the sub-image is determined based on the similarity. Here, the comparison model may be a model trained based on a Siamese neural network, but the present disclosure is not limited to the specific type of the model. Accordingly, based on the determined correspondence relation between the first panoramic image and the sub-images, it may be determined that the first panoramic image 603 corresponds to the middle portion of the second panoramic image 401, and the first panoramic image 604 corresponds to the middle portion of the second panoramic image 401. Thus, the relative positions of the adjacent subspaces corresponding to the two first panoramic images can be obtained.

Figure 7:
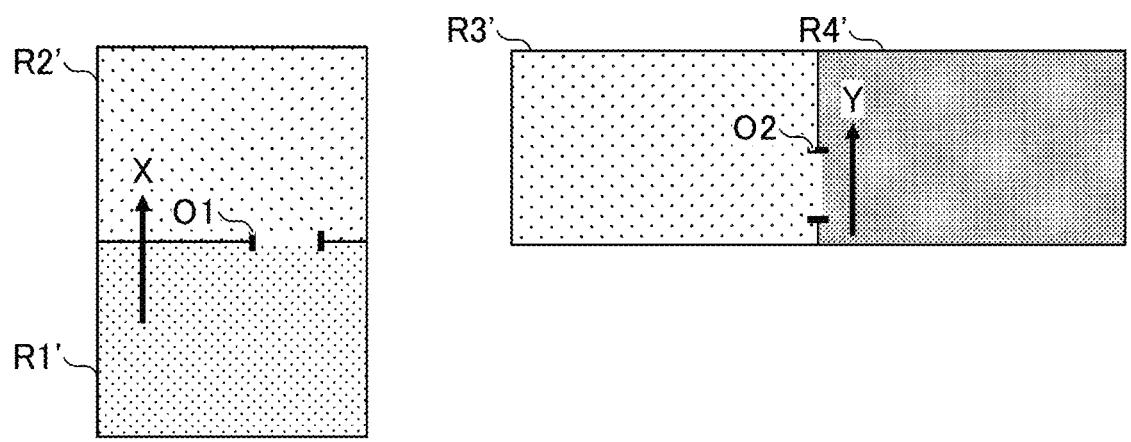
FIG. 7 is a schematic diagram illustrating a determination result of relative positions of two adjacent subspaces according to the embodiment of the present disclosure.

FIG. 7 is a schematic diagram illustrating a determination result of relative positions of two adjacent subspaces according to the embodiment of the present disclosure. Here, the relative positions defines the positions of the two adjacent subspaces relative to the connection opening that connecting the two adjacent subspaces, namely, defines which side or which direction of the two adjacent subspaces are located on the connection opening, respectively. Since it has been determined in step S102 that the orientation of the connection opening O1 is X+90 degrees, the two adjacent subspaces connected by the connection opening O1 are located in the X direction and the −X direction of the connection opening, respectively. Accordingly, after it is determined that the first panoramic image 603 corresponds to the middle portion of the second panoramic image 401 and the first panoramic image 604 corresponds to two edges of the second panoramic image 401, it may be determined that the relative position of the subspace (shown as R2' in FIG. 7) corresponding to the first panoramic image 603 is the X direction of the connection opening O1, and the relative position of the subspace (shown as R1' in FIG. 7) corresponding to the first panoramic image 604 is the −X direction of the connection opening O1. Namely, the relative positions of two adjacent subspaces R1' and R2' of a set of subspaces as shown in the left portion of FIG. 7 is obtained.

Similarly, the process of the above step S103 may be repeated for another set of panoramic images photographed at the connection opening O2 and photographed in the two adjacent subspaces connected by the connection opening O2, so as to obtain the relative positions of two adjacent subspaces R3' and R4' of another set of subspaces as shown in the right portion of FIG. 7.

In step S104, the first panoramic images in the sets of the panoramic images that correspond to the same subspace are recognized, the connection relation between the respective sets of the subspaces is determined based on the same subspace, and the connection relation of the subspaces in the three-dimensional space is determined based on the determined connection relation between the sets of the subspaces, the orientations of the respective connection openings, and the relative positions of the two adjacent subspaces in the respective sets of the subspaces.

In this step, similarities between the first panoramic images in a set of panoramic images and the first panoramic images in another set of panoramic images may be compared, so as to recognize the first panoramic images in the sets of the panoramic images that correspond to the same subspace. Here, as described above, a first panoramic image of a set of panoramic images and a first panoramic image of another set of panoramic images may be input to the comparison model trained based on the Siamese neural network to obtain a similarity of the two output images, so that the first panoramic images corresponding to the same subspace is recognized based on the similarity.

As shown in FIG. 7, after determining that there are two sets of subspaces in the three-dimensional space, the connection relation between the two sets of subspaces will be determined, namely, it will be determined which specific subspaces is used to connect the two sets of subspaces to form a complete three-dimensional space. In this example, if it is determined that the similarity between a first panoramic image corresponding to the subspace R2' of a set of subspaces and the first panoramic image corresponding to the subspace R3' of another set of subspaces is greater than a threshold, it may be determined that the subspaces R2' and R3' are substantially the same subspace. Accordingly, the connection relation between the respective sets of the subspaces may be determined based on the same subspace. Namely, it may be determined that the two sets of subspaces may be connected using the subspaces R2' and R3' to form a complete three-dimensional space. Accordingly, a set of subspaces in the left portion of FIG. 7 may be connected with another set of subspaces in the right portion of FIG. 7 by overlapping the subspaces R2' and R3' with each other.

After connecting the sets of the subspaces to each other based on the connection relation of the sets of the subspaces, the connection relation of the subspaces in the three-dimensional space may be determined based on the determined connection relation between the sets of the subspaces, the orientations of the respective connection openings, and the relative positions of the two adjacent subspaces in the respective sets of the subspaces.

Additionally, after determining the connection relation of the subspaces, a two-dimensional layout image of the three-dimensional space may be further generated based on the determined connection relation of the subspaces.

Figure 8:
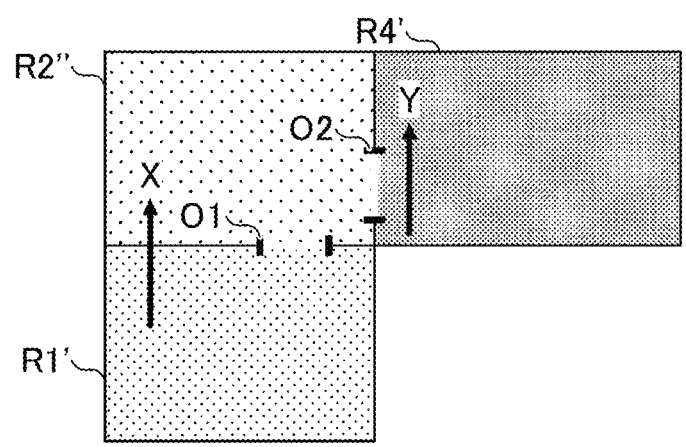
FIG. 8 is a schematic diagram illustrating a step of generating a two-dimensional layout image based on the determined connection relation of the subspaces according to the embodiment of the present disclosure.

FIG. 8 is a schematic diagram illustrating a step of generating a two-dimensional layout image based on the determined connection relation of the subspaces according to the embodiment of the present disclosure. As shown in FIG. 8, a two-dimensional layout image similar to the image shown in FIG. 2 may be generated by overlapping the subspaces R2' and R3' shown in FIG. 7 based on the determined connection relation of the subspaces to form the subspace R2" shown in FIG. 8.

From above, in the method for determining a connection relation of subspaces according to the embodiment of the present disclosure, the connection relation of the subspaces in the three-dimensional space can be determined based on the panoramic images photographed in the subspaces in the three-dimensional space, and the panoramic images photographed at the connection openings that connect the respective sets of the adjacent subspaces. Thus, the two-dimensional layout image of the three-dimensional space can be automatically generated based on the determined connection relation of the subspaces, thereby improving the generation efficiency of the two-dimensional layout image.

Figure 9:
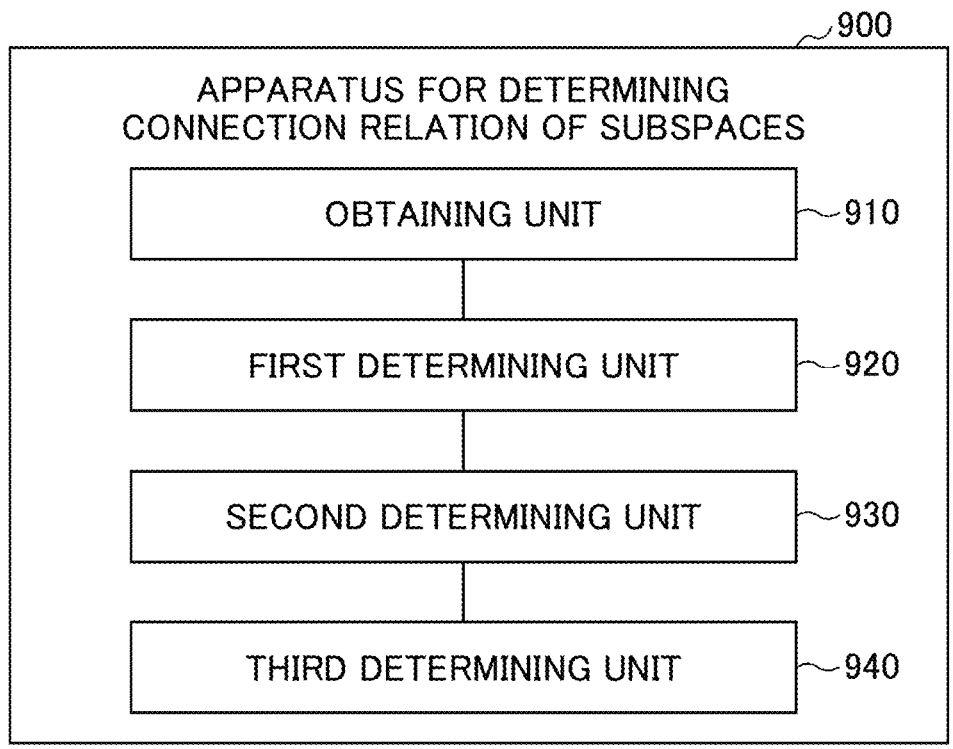
FIG. 9 is a schematic block diagram illustrating an apparatus 900 for determining a connection relation of subspaces according to another embodiment of the present disclosure.

Next, an apparatus for determining a connection relation of subspaces according to another embodiment of the present disclosure will be described below with reference to FIG. 9. FIG. 9 is a schematic block diagram illustrating an apparatus 900 for determining a connection relation of subspaces according to another embodiment of the present disclosure. As shown in FIG. 9, the apparatus 900 for determining a connection relation of subspaces includes an obtaining unit 910, a first determining unit 920, a second determining unit 930, and a third determining unit 940. Note that the apparatus 900 for determining a connection relation of subspaces may also include other components, however, since these components are not related to the content of the embodiment of the present disclosure, their illustration and description are omitted here. In addition, since the specific details of the following operations performed by the apparatus 900 for determining a connection relation of subspaces according to the embodiment of the present disclosure are the same as those described above with reference to FIGS. 1 to 8, repeated descriptions of the same details are omitted here to avoid repetition.

First, the obtaining unit 910 obtains a plurality of sets of panoramic images respectively corresponding to a plurality of sets of the subspaces in a three-dimensional space. Each set of the subspaces are composed of two adjacent subspaces in the three-dimensional space. Each set of the panoramic images include two first panoramic images that respectively photographed in the two adjacent subspaces of the respective sets of the subspaces, and a second panoramic image photographed at a connection opening that connects the two adjacent subspaces.

Here, the first panoramic images and the second panoramic images of the sets of the subspaces may be generated in a predetermined photographing order, and the sets of panoramic images may be obtained by grouping the first panoramic images and the second panoramic images of the sets of the subspaces in the predetermined photographing order. For example, as shown in FIG. 2, if the first panoramic images and the second panoramic images of the sets of the subspaces are generated in a predetermined photographing order of P1, P2, P3, P4, P5 and P6, the obtaining unit 910 may classify the first three panoramic images into a group, and may classify the last three panoramic images into another group in the predetermined photographing order. As another example, if the first panoramic images and the second panoramic images of the sets of the subspaces are generated in a predetermined photographing order of P2, P5, P1, P3, P4 and P6, the obtaining unit 910 may classify the first, third and fourth panoramic images into a group, and may classify the second, fifth and sixth panoramic images into another group in the predetermined photographing order. Thus, the obtaining unit 910 according to the embodiment of the present disclosure can automatically group the input panoramic images in the predetermined photographing order previously input or set by a user, thereby facilitating subsequent processing.

Note that since the camera may not be completely horizontally disposed during the actual photographing process, the panoramic image obtained by photographing may be skewed to a certain extent. In this case, the obtaining unit 910 may perform vertical correction processing on the first panoramic images and the second panoramic image, before the subsequent processing is performed on the obtained first panoramic images and the second panoramic image, so as to improve the accuracy of the subsequent processing.

The first determining unit 920 determines orientations of the respective connection openings based on positions of the connection openings in the respective second panoramic images, and orientations of a camera when photographing the respective second panoramic images.

First, the first determining unit 920 determines orientations of the camera when photographing the respective second panoramic images based on sensor data of the camera when photographing the respective second panoramic images.

Specifically, the first determining unit 920 may use the camera orientation when photographing any one second panoramic image as a reference orientation, so that the camera orientations when photographing other second panoramic images are determined based on the reference orientation. FIG. 4 is a schematic diagram illustrating an example of a reference orientation according to the embodiment of the present disclosure. The left portion of FIG. 4 shows the second panoramic image 401 photographed at the connection opening O1, the arrow direction X shown in the right portion of FIG. 4 is a camera orientation when photographing the second panoramic image 401 in a top view, and the camera orientation corresponds to a position of a central image column of the second panoramic image 401. Here, the position of the central image column is a position of an image in the most central column of the panoramic image in a horizontal direction (for example, a 0 degree position in the panoramic image coordinate system shown in FIG. 4). In this example, the first determining unit 920 may use the camera orientation X when photographing the second panoramic image 401 at the connection opening O1 as the reference orientation. Additionally, in another example, a camera orientation when photographing the second panoramic image at the connection opening O2 may also be used as the reference orientation, and the present disclosure is not limited these examples.

In a case where the camera orientation X when photographing the second panoramic image 401 at the connection opening O1 is used as the reference orientation, the first determining unit 920 may determine an included angle between a camera orientation when photographing another second panoramic image and the reference orientation based on sensor data of the camera, so that the camera orientation when photographing another second panoramic image is obtained. Specifically, the first determining unit 920 may determine an included angle between the camera orientation when photographing the second panoramic image at the connection opening O2 and the reference orientation X based on sensor data of the camera when photographing the second panoramic image at the connection openings O1 and O2, so that the camera orientation Y (not shown in FIG. 4) when photographing the second panoramic image at the connection opening O2 is obtained. For example, in a case where the determined included angle is $\alpha$, the first determining unit 920 may obtain the camera orientation $Y=X+\alpha$ when photographing the second panoramic image at the connection opening O2. Thus, the orientations of the connection opening O1 and the connection opening O2 can be finally determined based on the camera orientations X and Y in subsequent steps.

Next, the first determining unit 920 detects the positions of the connection openings in the respective second panoramic images.

In an example, the first determining unit 920 may input the second panoramic images to a trained object detection model so as to obtain two bounding boxes corresponding to the connection openings output by the object detection model, and most central positions of the two bounding boxes in the horizontal direction may be used as the detected positions of the connection openings. Here, the object detector model may be a model trained by a target detection algorithm based on a deep neural network, such as a YOLOv3 object detection model. However, other types of object detection models may also be used, and the present disclosure is not limited these examples.

FIG. 5 is a schematic diagram illustrating a step of detecting a position of a connection opening according to the embodiment of the present disclosure.

The left portion of FIG. 5 shows the same second panoramic image 401 as the image shown in FIG. 4, which is photographed at the connection opening O1, and the right portion of FIG. 5 further shows the second panoramic image 402 photographed at the connection opening O2. As shown in FIG. 5, the first determining unit 920 may obtain two bounding boxes 501 and 502 corresponding to the connection opening O1 output by the object detection model by inputting the second panoramic image 401 photographed at the connection opening O1 to the object detection model. The first determining unit 920 may use the most central positions 503 and 504 of the bounding boxes 501 and 502 in the horizontal direction as the positions of the detected connection opening O1, respectively. It can be seen from FIG. 5 that the most central positions 503 and 504 are located approximately at a 90 degrees position and a −90 degrees position in the panoramic image coordinate system.

In another example, the first determining unit 920 may detect the position of the connection opening by using the object detection model and calculating a variance of pixels of each column in the respective second panoramic images.

Specifically, since the connection openings generally have less variation in texture, color and the like, the difference of pixels of the column corresponding to the connection opening should be minimal compared to the pixels of other columns. Accordingly, the first determining unit 920 may calculate the variance of pixels of each column in the second panoramic image respectively, and may use a horizontal coordinate of the column whose variance of pixels is the smallest as one of the positions of the detected connection openings. Furthermore, the first determining unit 920 may use another horizontal coordinate that is spaced from the horizontal coordinate by a half of a horizontal width of the panoramic image as another position of the connection opening.

Similarly, the first determining unit 920 may repeat the above steps for the second panoramic image 402 photographed at the connection opening O2, so as to obtain positions 505 and 506 of the detected connection opening O2. It can be seen from FIG. 5 that the positions 505 and 506 are located approximately at a 0 degree position and a 180 degrees position in the panoramic image coordinate system.

Finally, the first determining unit 920 determines the orientations of the respective connection openings based on the detected positions of the connection openings in the respective second panoramic images, and the orientations of the camera.

Here, the first determining unit 920 may determine the orientations of the respective connection openings based on differences between the positions of the connection openings in the respective second panoramic images and positions of respective central image columns, and the orientations of the camera. Here, the orientation of the connection opening may be represented by a direction of a straight line passing through a specific connection opening.

As shown in FIG. 5, in the second panoramic image 401, the differences between the positions 503 and 504 of the detected connection opening O1 and the position of the central image column (as described above, the position of the central image column is a degree position in the panoramic image coordinate system that corresponds to the camera orientation X when photographing the second panoramic image 401) are approximately 90 degrees and −90 degrees. The first determining unit 920 may determine that the included angle between the orientation of the connection opening O1 and the camera orientation X is degrees, based on this difference, that is, the orientation of those two are substantially perpendicular to each other.

Similarly, in the second panoramic image 402, the differences between the positions 505 and 506 of the detected connection opening O2 and the position of the central image column (as described above, the position of the central image column is a degree position in the panoramic image coordinate system that corresponds to the camera orientation Y when photographing the second panoramic image 402) are approximately 0 degree and 180 degrees. The first determining unit 920 may determine that the included angle between the orientation of the connection opening O2 and the camera orientation Y is degree, based on this difference, that is, the orientation of those two are substantially parallel to each other.

After obtaining the included angles between the orientations of the respective connection openings and the respective camera orientations, the first determining unit 920 may convert the orientations of the respective connection openings into an absolute orientation corresponding to the same reference orientation using the camera orientations, so as to finally determine the orientation of the connection opening. Specifically, in this example, since it is determined that the reference orientation is the camera orientation X, and the included angle between the orientation of the connection opening O1 and the camera orientation X is 90 degrees, it is finally determined that the orientation of the connection opening is X+90 degrees. Furthermore, in a case where the included angle between the camera orientation Y and the reference orientation is α (namely, the camera orientation is Y=X+α), and the included angle between the orientation of the connection opening O2 and the camera orientation Y is 0 degree, it is finally determined that the orientation of the connection opening O2 is X+α. Through the above process, the first determining unit 920 can determine the orientation of the connection opening.

The second determining unit 930 obtains correspondence relations between the two first panoramic images in the respective sets of the panoramic images and parts of the second panoramic images in the respective sets of panoramic images, and determines the relative positions of the two adjacent subspaces in the respective sets of the subspaces based on the correspondence relations.

Here, the second determining unit 930 may divide the second panoramic images into two respective sub-images, based on the detected positions of the connection openings in the respective second panoramic images in the respective sets of panoramic images. Then, similarities between the two first panoramic images and the two respective sub-images in the respective sets of panoramic images may be compared to obtain the correspondence relations.

FIG. 6 is a schematic diagram illustrating a step of obtaining a correspondence relation between two first panoramic images and a part of a second panoramic image. As shown in FIG. 6, the second determining unit 930 may divide the second panoramic image 401 into two sub-images 601 and 602 by dividing the second panoramic image 401 at the position of the connection opening O1 detected from the second panoramic image 401 in a set of panoramic images. Here, the sub-image 601 is an image obtained by segmenting a middle portion of the second panoramic image 401, and the sub-image 602 is an image obtained by segmenting and splicing the portions on the left and right edges of the second panoramic image 402. The two sub-images correspond to the two adjacent subspaces connected by the connection opening O1, respectively.

Additionally, FIG. 6 further shows a first panoramic image 603 and a first panoramic image 604 in the set of panoramic images, which are respectively photographed in the two adjacent subspaces. By comparing the similarities between the first panoramic images 603 and 604 and the two sub-images 601 and 602, respectively, the second determining unit 930 may determine that the first panoramic image 603 is more similar to the sub-image 601 and the first panoramic image 604 is more similar to the sub-image 602. Thus, the second determining unit 930 may determine that the first panoramic image 603 corresponds to the sub-image 601 and the first panoramic image 604 corresponds to the sub-image 602. Here, the second determining unit 930 may input a first panorama image and a sub-image to a trained comparison model to obtain the similarity of the two images output by the model, so that a correspondence relation between the first panorama image and the sub-image is determined based on the similarity. Here, the comparison model may be a model trained based on a Siamese neural network, but the present disclosure is not limited to the specific type of the model. Accordingly, based on the determined correspondence relation between the first panoramic image and the sub-images, the second determining unit 930 may determine that the first panoramic image 603 corresponds to the middle portion of the second panoramic image 401, and the first panoramic image 604 corresponds to the middle portion of the second panoramic image 401. Thus, the relative positions of the adjacent subspaces corresponding to the two first panoramic images can be obtained.

FIG. 7 is a schematic diagram illustrating a determination result of relative positions of two adjacent subspaces according to the embodiment of the present disclosure. Here, the relative positions defines the positions of the two adjacent subspaces relative to the connection opening that connecting the two adjacent subspaces, namely, defines which side or which direction of the two adjacent subspaces are located on the connection opening, respectively. Since the second determining unit 930 has been determined that the orientation of the connection opening O1 is X+90 degrees, the two adjacent subspaces connected by the connection opening O1 are located in the X direction and the -X direction of the connection opening, respectively. Accordingly, after the second determining unit 930 determines that the first panoramic image 603 corresponds to the middle portion of the second panoramic image 401 and the first panoramic image 604 corresponds to two edges of the second panoramic image 401, the second determining unit 930 may determine that the relative position of the subspace (shown as R2' in FIG. 7) corresponding to the first panoramic image 603 is the X direction of the connection opening O1, and the relative position of the subspace (shown as R1' in FIG. 7) corresponding to the first panoramic image 604 is the -X direction of the connection opening O1. Namely, the relative positions of two adjacent subspaces R1' and R2' of a set of subspaces as shown in the left portion of FIG. 7 is obtained.

Similarly, the second determining unit 930 may repeat the process of the above step S103 may be repeated for another set of panoramic images photographed at the connection opening O2 and photographed in the two adjacent subspaces connected by the connection opening O2, so as to obtain the relative positions of two adjacent subspaces R3' and R4' of another set of subspaces as shown in the right portion of FIG. 7.

The third determining unit 940 recognizes the first panoramic images in the sets of the panoramic images that correspond to the same subspace, determines the connection relation between the respective sets of the subspaces based on the same subspace, and determines the connection relation of the subspaces in the three-dimensional space based on the determined connection relation between the sets of the subspaces, the orientations of the respective connection openings, and the relative positions of the two adjacent subspaces in the respective sets of the subspaces.

Here, the third determining unit 940 may compare similarities between the first panoramic images in a set of panoramic images and the first panoramic images in another set of panoramic images, so as to recognize the first panoramic images in the sets of the panoramic images that correspond to the same subspace. As described above, the third determining unit 940 may input a first panoramic image of a set of panoramic images and a first panoramic image of another set of panoramic images to the comparison model trained based on the Siamese neural network to obtain a similarity of the two output images, so that the first panoramic images corresponding to the same subspace is recognized based on the similarity.

As shown in FIG. 7, after determining that there are two sets of subspaces in the three-dimensional space, the third determining unit 940 will determine the connection relation between the two sets of subspaces, namely, will determine which specific subspaces is used to connect the two sets of subspaces to form a complete three-dimensional space. In this example, if the third determining unit 940 determines that the similarity between a first panoramic image corresponding to the subspace R2' of a set of subspaces and the first panoramic image corresponding to the subspace R3' of another set of subspaces is greater than a threshold, the third determining unit 940 may determine that the subspaces R2' and R3' are substantially the same subspace. Accordingly, the third determining unit 940 may determine the connection relation between the respective sets of the subspaces based on the same subspace. Namely, the third determining unit 940 may determine that the two sets of subspaces may be connected using the subspaces R2' and R3' to form a complete three-dimensional space. Accordingly, the third determining unit 940 may connect a set of subspaces in the left portion of FIG. 7 with another set of subspaces in the right portion of FIG. 7 by overlapping the subspaces R2' and R3' with each other.

After connecting the sets of the subspaces to each other based on the connection relation of the sets of the subspaces, the third determining unit 940 may determine the connection relation of the subspaces in the three-dimensional space based on the determined connection relation between the sets of the subspaces, the orientations of the respective connection openings, and the relative positions of the two adjacent subspaces in the respective sets of the subspaces.

Additionally, after determining the connection relation of the subspaces, an image generating unit (not shown) may further generate a two-dimensional layout image of the three-dimensional space based on the determined connection relation of the subspaces.

FIG. 8 is a schematic diagram illustrating a step of generating a two-dimensional layout image based on the determined connection relation of the subspaces according to the embodiment of the present disclosure. As shown in FIG. 8, a two-dimensional layout image similar to the image shown in FIG. 2 may be generated by overlapping the subspaces R2' and R3' shown in FIG. 7 based on the determined connection relation of the subspaces to form the subspace R2" shown in FIG. 8.

From above, the apparatus for determining a connection relation of subspaces according to the embodiment of the present disclosure can determine the connection relation of the subspaces in the three-dimensional space based on the panoramic images photographed in the subspaces in the three-dimensional space, and the panoramic images photographed at the connection openings that connect the respective sets of the adjacent subspaces. Thus, the two-dimensional layout image of the three-dimensional space can be automatically generated based on the determined connection relation of the subspaces, thereby improving the generation efficiency of the two-dimensional layout image.

Figure 10:
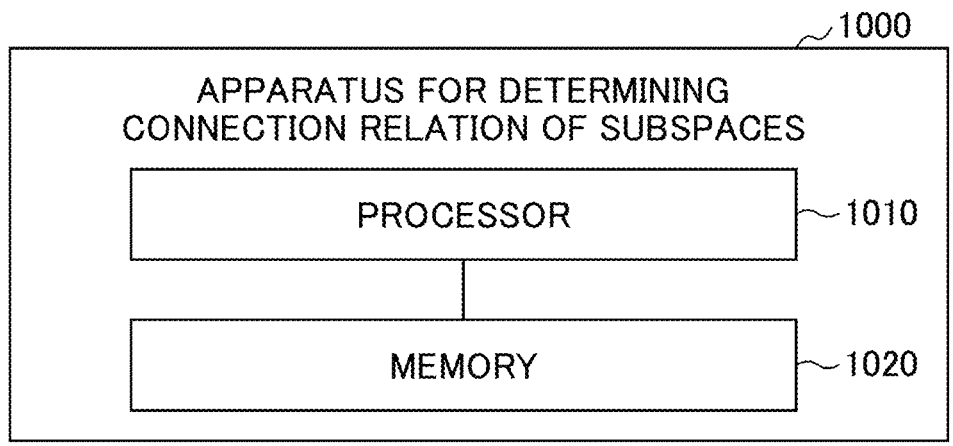
FIG. 10 is a schematic block diagram illustrating an apparatus 1000 for determining a connection relation of subspaces according to another embodiment of the present disclosure.

Next, an apparatus for determining a connection relation of subspaces according to another embodiment of the present disclosure will be described below with reference to FIG. 10. FIG. 10 is a schematic block diagram illustrating an apparatus 1000 for determining a connection relation of subspaces according to another embodiment of the present disclosure. As shown in FIG. 10, the apparatus 1000 may be a computer or a server.

As shown in FIG. 10, the apparatus 1000 for determining a connection relation of subspaces includes one or more processors 1010, and a memory 1020. Note that the apparatus 1000 for determining a connection relation of subspaces may further include an input device, an output device and the like (not shown). These components may be interconnected by a bus system and/or another form of connection mechanism. Note that the components and structures of the apparatus 1000 for determining a connection relation of subspaces shown in FIG. 10 are merely exemplary and not limiting, and the apparatus 1000 for determining a connection relation of subspaces may have other components and structures as desired.

The processor 1010 may be a central processing unit (CPU) or another form of processing unit having data processing capabilities and/or instruction execution capabilities, and may utilize computer program instructions stored in the memory 1020 to perform desired functions. The processor 1010 may be configured to obtain a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces; determine, based on positions of the connection openings in the respective second panoramic images, and orientations of a camera when photographing the respective second panoramic images, orientations of the respective connection openings; obtain correspondence relations between the two first panoramic images in the respective sets of the panoramic images and parts of the second panoramic images in the respective sets of panoramic images; determine, based on the correspondence relations, relative positions of the two adjacent subspaces in the respective sets of the subspaces; recognize the first panoramic images in the sets of the panoramic images that correspond to the same subspace; determine, based on the same subspace, the connection relation between the respective sets of the subspaces; and determine, based on the determined connection relation between the sets of the subspaces, the orientations of the respective connection openings, and the relative positions of the two adjacent subspaces in the respective sets of the subspaces, the connection relation of the subspaces in the three-dimensional space.

The memory 1020 may include one or more computer program products, and the computer program products may include various forms of computer readable storage media, such as volatile memory and/or nonvolatile memory. One or more computer program instructions may be stored in the computer readable storage medium, and the processor 1010 may execute the program instructions to implement the functions of the apparatus of the embodiments of the invention described above and/or other desired functions, and/or may perform the method of the embodiments of the present disclosure. Various application programs and various data may also be stored in the computer readable storage medium.

Next, in another embodiment of the present disclosure, a non-transitory computer-readable recording medium is further provided. The non-transitory computer-readable recording medium has computer-executable instructions for execution by one or more processors. When the computer-executable instructions are executed, the computer-executable instructions cause the one or more processors to carry out a method for determining a connection relation of subspaces. The method includes obtaining a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces; determining, based on positions of the connection openings in the respective second panoramic images, and orientations of a camera when photographing the respective second panoramic images, orientations of the respective connection openings; obtaining correspondence relations between the two first panoramic images in the respective sets of the panoramic images and parts of the second panoramic images in the respective sets of panoramic images; determining, based on the correspondence relations, relative positions of the two adjacent subspaces in the respective sets of the subspaces; recognizing the first panoramic images in the sets of the panoramic images that correspond to the same subspace; determining, based on the same subspace, the connection relation between the respective sets of the subspaces; and determining, based on the determined connection relation between the sets of the subspaces, the orientations of the respective connection openings, openings, and the relative positions of the two adjacent subspaces in the respective sets of the subspaces, the connection relation of the subspaces in the three-dimensional space.

Note that the above specific embodiments are just examples and the present disclosure is not limited to these embodiments. A person skilled in the art may merge and combine the steps and apparatuses separately described in the embodiments according to the concept of the present disclosure to achieve the effect of the present disclosure. The above embodiments obtained by the merging and combination are included in the present disclosure and their descriptions are omitted here.

Note that the advantages, benefits and effects described in the present specification are just examples, the present disclosure is not limited to these examples, and it cannot be considered that these advantages, benefits and effects are required by the embodiments of the present disclosure. Furthermore, the specific content of the present specification is only for description and understanding rather than limitation, and the present disclosure is not limited to specific content.

The block diagrams of the units, apparatuses, devices and system are just examples, the connection, placement and configuration illustrated in the block diagrams related to the present disclosure are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not applicable. The term "such as" means and may be changed to "such as, but not limited to".

The flowchart and the method according to the present disclosure are just examples, and not limited to the steps in the embodiments. The steps of the embodiments may be performed in any order. The terms "next", "subsequently" and "then" are just for describing the present disclosure, and the present disclosure is not limited to these terms. Furthermore, the articles "a", "an" and "the" should not be limited to the singular element.

The steps or apparatuses of the present disclosure are described above. The above descriptions of the embodiments are just examples, and various modifications, replacements or combinations may be made without departing from the scope of the present disclosure by persons skilled in the art.

The steps of the above method may be performed by any appropriate means that can perform the corresponding functions. The means may include any components and/or modules of hardware and/or software, and include but are not limited to a circuit, a dedicated application-specific integrated circuit (ASIC) or a processor.

The present disclosure may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processor, controller, micro-controller or state machine that can be obtained commercially. The processor may also be the combination of computer equipment, such as the combination of a DSP and a micro-processor, the combination of plural micro-processors, or the combination of a DSP and plural micro-processors.

The steps of the method according to the present disclosure may be incorporated in the hardware, software modules executed by a processor or the combination of these two directly. The software modules may be stored in a recording medium with any configuration. The examples of the recording medium includes a random access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Steps of the above method may be performed in a time order as above, however the performing sequence is not limited to such a time order. Any steps may be performed in parallel or independently.

The functions may be realized by hardware, software, firmware or any combination thereof. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such a disk and disc include a CD, a laser disc, an optical disc, a DVD disc, a floppy disk and a blue-ray disc, and the disk usually reproduces data by magnetization and the disc reproduces data by a laser.

Thus, the operations may be performed by a computer program product. For example, such a computer program product may be a tangible medium where computer-readable commands are stored (or coded), and the commands may be executed by one or more processors to perform the operation. The computer program product may include packaging material.

The software or commands may also be transmitted by a transmission medium. For example, a coaxial cable, an optical cable, a twisted cable, a digital subscriber line (DSL), or a transmission medium of the wireless technology of infrared, wireless or microwave may be used to transmit the software from a website, a server or another remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disk), so that the user terminal and/or the base station can obtain the methods when it is connected to the equipment. Furthermore, any other appropriate technology may be provided to the equipment by the method.

The present specification and the appended claims include other examples and implementations. For example, the above functions may be implemented by a processor, hardware, software, firmware, hard-wire or any combination thereof. The features for implementing the functions may be located at any physical location, including being distributed such that a part of the functions may be realized at a different physical location(s). Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present disclosure by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present disclosure. Therefore, the scope of the appended claims include such processing, machine, manufacture, composition of events, means, method and operation.

The embodiments have been described above so that persons skilled in the art can implement the present disclosure. Various modifications to these embodiments will be apparent to persons skilled in the art, and the general principles defined herein may be applied to other aspects without departing from the scope of the present disclosure. Thus, the present disclosure is not intended to be limited to the above described embodiments, but rather is the broadest scope consistent with the principles and novel features of the present disclosure.

The foregoing has been described for purposes of illustration and understanding. The above description is not intended to limit the embodiments of the present disclosure. While several embodiments and examples have been described above, variations, modifications, changes, additions, and combinations can be performed by persons skilled in the art.

What is claimed is:

1. A method for determining a connection relation of subspaces, the method comprising:
    obtaining a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces;
    perform vertical correction processing on the two first panoramic images and the second panoramic image;
    determining, based on positions of the connection openings in the respective second panoramic images, and orientations of a camera when photographing the respective second panoramic images, orientations of the respective connection openings;
    obtaining correspondence relations between the two first panoramic images in the respective sets of the panoramic images and parts of the second panoramic images in the respective sets of panoramic images, the correspondence relations mapping the two first panoramic images to parts of the second panoramic images, wherein obtaining the correspondence relations between the two first panoramic images and the parts of the second panoramic images includes:
        dividing, based on the detected positions of the connection openings in the respective second panoramic images in the respective sets of panoramic images, the second panoramic images into two respective sub-images; and
        comparing similarities between the two first panoramic images and the two respective sub-images in the respective sets of panoramic images to obtain the correspondence relations;
    determining, based on the correspondence relations, relative positions of the two adjacent subspaces in the respective sets of the subspaces;
    recognizing the first panoramic images in the sets of the panoramic images that correspond to the same subspace;
    determining, based on the same subspace, the connection relation between the respective sets of the subspaces;
    determining, based on the determined connection relation between the sets of the subspaces, the orientations of the respective connection openings, and the relative positions of the two adjacent subspaces in the respective sets of the subspaces, the connection relation of the subspaces in the three-dimensional space; and
    generating, based on the determined connection relation of the subspaces in the three-dimensional space, a two-dimensional layout image of the three-dimensional space.

2. The method for determining a connection relation of subspaces as claimed in claim 1,
    wherein the first panoramic images and the second panoramic images of the sets of the subspaces are generated in a predetermined photographing order, and
    wherein the sets of panoramic images are obtained by grouping the first panoramic images and the second panoramic images of the sets of the subspaces in the predetermined photographing order.

3. The method for determining a connection relation of subspaces as claimed in claim 1,
    wherein determining the orientations of the respective connection openings includes
        determining, based on sensor data of the camera when photographing the respective second panoramic images, orientations of the camera when photographing the respective second panoramic images;
        detecting the positions of the connection openings in the respective second panoramic images; and
        determining, based on the detected positions of the connection openings in the respective second panoramic images, and the orientations of the camera, the orientations of the respective connection openings.

4. The method for determining a connection relation of subspaces as claimed in claim 3,
    wherein determining the orientations of the respective connection openings includes
        determining, based on differences between the positions of the connection openings in the respective second panoramic images and positions of respective central image columns, and the orientations of the camera, the orientations of the respective connection openings.

5. The method for determining a connection relation of subspaces as claimed in claim 1,
    wherein recognizing the first panoramic images includes
        comparing similarities between the first panoramic images in a set of panoramic images and the first panoramic images in another set of panoramic images to recognize the first panoramic images in the sets of the panoramic images that correspond to the same subspace.

6. An apparatus for determining a connection relation of subspaces, the apparatus comprising:
a memory storing computer-executable instructions; and
one or more processors configured to execute the computer-executable instructions such that the one or more processors are configured to:
obtain a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces;
perform vertical correction processing on the two first panoramic images and the second panoramic image;
determine, based on positions of the connection openings in the respective second panoramic images, and orientations of a camera when photographing the respective second panoramic images, orientations of the respective connection openings;
obtain correspondence relations between the two first panoramic images in the respective sets of the panoramic images and parts of the second panoramic images in the respective sets of panoramic images, the correspondence relations mapping the two first panoramic images to parts of the second panoramic images, wherein obtaining the correspondence relations between the two first panoramic images and the parts of the second panoramic images includes:
dividing, based on the detected positions of the connection openings in the respective second panoramic images in the respective sets of panoramic images, the second panoramic images into two respective sub-images; and
comparing similarities between the two first panoramic images and the two respective sub-images in the respective sets of panoramic images to obtain the correspondence relations;
determine, based on the correspondence relations, relative positions of the two adjacent subspaces in the respective sets of the subspaces;
recognize the first panoramic images in the sets of the panoramic images that correspond to the same subspace;
determine, based on the same subspace, the connection relation between the respective sets of the subspaces;
determine, based on the determined connection relation between the sets of the subspaces, the orientations of the respective connection openings, and the relative positions of the two adjacent subspaces in the respective sets of the subspaces, the connection relation of the subspaces in the three-dimensional space; and
generate, based on the determined connection relation of the subspaces in the three-dimensional space, a two-dimensional layout image of the three-dimensional space.

7. The apparatus for determining a connection relation of subspaces as claimed in claim 6,
wherein the first panoramic images and the second panoramic images of the sets of the subspaces are generated in a predetermined photographing order, and
wherein the sets of panoramic images are obtained by grouping the first panoramic images and the second panoramic images of the sets of the subspaces in the predetermined photographing order.

8. The apparatus for determining a connection relation of subspaces as claimed in claim 6,
wherein the one or more processors are configured to;
determine, based on sensor data of the camera when photographing the respective second panoramic images, orientations of the camera when photographing the respective second panoramic images;
detect the positions of the connection openings in the respective second panoramic images; and
determine, based on the detected positions of the connection openings in the respective second panoramic images, and the orientations of the camera, the orientations of the respective connection openings.

9. The apparatus for determining a connection relation of subspaces as claimed in claim 8,
wherein the one or more processors are configured to:
determine, based on differences between the positions of the connection openings in the respective second panoramic images and positions of respective central image columns, and the orientations of the camera, the orientations of the respective connection openings.

10. The apparatus for determining a connection relation of subspaces as claimed in claim 6,
wherein the one or more processors are configured to:
compare similarities between the first panoramic images in a set of panoramic images and the first panoramic images in another set of panoramic images to recognize the first panoramic images in the sets of the panoramic images that correspond to the same subspace.

11. A non-transitory computer-readable recording medium having computer-executable instructions for execution by one or more processors, wherein, the computer-executable instructions, when executed, cause the one or more processors to carry out a method for determining a connection relation of subspaces, the method comprising:
obtaining a plurality of sets of panoramic images respectively corresponding to a plurality of sets of the subspaces in a three-dimensional space, each set of the subspaces being composed of two adjacent subspaces in the three-dimensional space, and each set of the panoramic images including two first panoramic images that respectively photographed in the two adjacent subspaces of the respective sets of the subspaces, and a second panoramic image photographed at a connection opening that connects the two adjacent subspaces;
performing vertical correction processing on the two first panoramic images and the second panoramic image;
determining, based on positions of the connection openings in the respective second panoramic images, and orientations of a camera when photographing the respective second panoramic images, orientations of the respective connection openings;
obtaining correspondence relations between the two first panoramic images in the respective sets of the panoramic images and parts of the second panoramic images in the respective sets of panoramic images, the correspondence relations mapping the two first panoramic images to parts of the second panoramic images, wherein obtaining the correspondence relations between the two first panoramic images and the parts of the second panoramic images includes:
- dividing, based on the detected positions of the connection openings in the respective second panoramic images in the respective sets of panoramic images, the second panoramic images into two respective sub-images; and
- comparing similarities between the two first panoramic images and the two respective sub-images in the respective sets of panoramic images to obtain the correspondence relations;

determining, based on the correspondence relations, relative positions of the two adjacent subspaces in the respective sets of the subspaces;

recognizing the first panoramic images in the sets of the panoramic images that correspond to the same subspace;

determining, based on the same subspace, the connection relation between the respective sets of the subspaces;

determining, based on the determined connection relation between the sets of the subspaces, the orientations of the respective connection openings, and the relative positions of the two adjacent subspaces in the respective sets of the subspaces, the connection relation of the subspaces in the three-dimensional space; and generating, based on the determined connection relation of the subspaces in the three-dimensional space, a two-dimensional layout image of the three-dimensional space.

* * * * *